(12) United States Patent
Balduin et al.

(10) Patent No.: US 8,978,418 B2
(45) Date of Patent: Mar. 17, 2015

(54) METHOD AND DEVICE FOR BENDING SHEETS

(75) Inventors: Michael Balduin, Alsdorf (DE); Benno Dunkmann, Eupen (BE); Jean-Marie Le Ny, Gemmenich (BE); Lothar Schmidt, Aachen (DE); Herbert Radermacher, Raeren (BE)

(73) Assignee: Saint-Gobain Glass France (FR)

( * ) Notice: Subject to any disclaimer, the term of this patent is extended or adjusted under 35 U.S.C. 154(b) by 0 days.

(21) Appl. No.: 13/990,399

(22) PCT Filed: Dec. 8, 2011

(86) PCT No.: PCT/EP2011/072170
§ 371 (c)(1),
(2), (4) Date: Aug. 9, 2013

(87) PCT Pub. No.: WO2012/080072
PCT Pub. Date: Jun. 21, 2012

(65) Prior Publication Data
US 2013/0313852 A1 Nov. 28, 2013

(30) Foreign Application Priority Data
Dec. 13, 2010 (EP) .................................... 10194711

(51) Int. Cl.
*C03B 23/03* (2006.01)
*C03B 23/023* (2006.01)
(Continued)

(52) U.S. Cl.
CPC ......... *C03B 23/0307* (2013.01); *C03B 23/0252* (2013.01); *C03B 23/03* (2013.01);
(Continued)

(58) Field of Classification Search
None
See application file for complete search history.

(56) References Cited

U.S. PATENT DOCUMENTS 3,114,571 A 12/1963 Carson et al.
5,285,660 A * 2/1994 Petitcollin et al. .............. 65/273
(Continued)

FOREIGN PATENT DOCUMENTS

DE 4337559 3/1995
DE 10314266 6/2004
(Continued)

OTHER PUBLICATIONS

PCT Written Opinion mailed on Feb. 27, 2012 for PCT Application PCT/EP2011/072492 filed on Dec. 12, 2011 in the name of Saint-Gobain Glass France (English + German Version).
(Continued)

*Primary Examiner* — Lisa Herring
(74) *Attorney, Agent, or Firm* — Steinfl & Bruno, LLP

(57) ABSTRACT

A method for bending a sheet is described. The method includes the following steps: a) at least one sheet is inserted into a pre-bending ring with a movable bending ring holder, the movable bending ring holder is moved into a furnace and the at least one sheet is heated to softening temperature and is pre-bent to 5% to 50% of a final edge bending, b) the at least one sheet is lifted by means of a suction device and is bent further, beyond the bending obtained in the pre-bending ring, c) the at least one sheet is laid down by means of the suction device in a final-bending ring on the movable bending ring holder and is bent to the final edge bending, and an area pre-bending of the at least one sheet is performed by means of thermal irradiation, d) the at least one sheet is lifted out of the final-bending ring by means of a second suction device, pressed against an opposing mould and bent, and the at least one sheet is laid down on the final-bending ring and the at least one sheet is cooled down.

12 Claims, 3 Drawing Sheets

Figure 1:
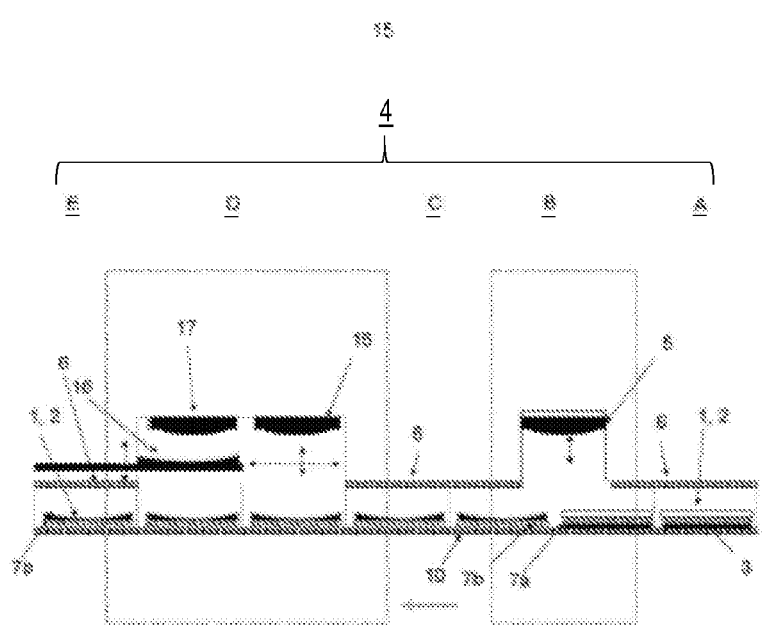

(51) Int. Cl.
 *C03B 23/025* (2006.01)
 *C03B 23/035* (2006.01)
 *C03B 35/14* (2006.01)
 *C03B 35/20* (2006.01)
 *B60J 1/00* (2006.01)

(52) U.S. Cl.
 CPC ........... *C03B23/0357* (2013.01); *C03B 35/145* (2013.01); *C03B 35/202* (2013.01); *B60J 1/008* (2013.01); *C03B 2225/02* (2013.01)
 USPC ................................. 65/107; 65/106; 65/93

(56) References Cited

U.S. PATENT DOCUMENTS

| | | | |
|---|---|---|---|
| 5,713,976 A * | 2/1998 | Kuster et al. ............. | 65/106 |
| 6,138,477 A | 10/2000 | Morin | |
| 7,231,787 B2 | 6/2007 | Neuman et al. | |
| 2005/0142332 A1 | 6/2005 | Sauer | |
| 2007/0157671 A1 | 7/2007 | Thellier et al. | |
| 2008/0134721 A1 | 6/2008 | Maeda | |
| 2008/0134722 A1 * | 6/2008 | Balduin et al. .......... | 65/106 |
| 2008/0190143 A1 | 8/2008 | Balduin et al. | |
| 2009/0277440 A1 * | 11/2009 | Angel et al. ............. | 126/601 |
| 2010/0236290 A1 * | 9/2010 | Fukami et al. ........... | 65/106 |
| 2010/0257900 A1 * | 10/2010 | Yajima et al. ........... | 65/106 |

FOREIGN PATENT DOCUMENTS

| | | |
|---|---|---|
| DE | 102005001513 | 6/2006 |
| DE | 102007059323 | 6/2009 |
| EP | 0677491 | 10/1995 |
| EP | 1371616 | 12/2003 |
| EP | 2233444 | 9/2010 |
| WO | 02064519 | 8/2002 |
| WO | 2010136702 | 12/2010 |
| WO | 2012080071 | 6/2012 |
| WO | 2012080072 | 6/2012 |

OTHER PUBLICATIONS

PCT Written Opinion mailed on Feb. 27, 2012 for PCT Application PCT/EP2011/072169 filed on Dec. 8, 2011 in the name of Saint-Gobain Glass France (English + German Version).
PCT Written Opinion mailed on Mar. 6, 2012 for PCT Application PCT/EP2011/072170 filed on Dec. 8, 2011 in the name of Saint-Gobain Glass France (English + German Version).
PCT International Search Report mailed on Feb. 27, 2012 for PCT Application PCT/EP2011/072492 filed on Dec. 12, 2011 in the name of Saint-Gobain Glass France (German + English Translation).
PCT International Search Report mailed on Feb. 27, 2012 for PCT Application PCT/EP2011/072169 filed on Dec. 8, 2011 in the name of Saint-Gobain Glass France (German + English Translation).
PCT International Search Report mailed on Mar. 6, 2012 for PCT Application PCT/EP2011/072170 filed on Dec. 8, 2011 in the name of Saint-Gobain Glass France (German + English Translation).
Restriction Requirement mailed on Feb. 28, 2014 for U.S. Appl. No. 14/015,850, filed Aug. 30, 2013 in the name of Saint-Gobain Glass France.
Non-Final Office Action mailed on Apr. 18, 2014 for U.S. Appl. No. 14/015,850, filed Aug. 30, 2013 in the name of Saint-Gobain Glass France.
Final Office Action mailed on Oct. 23, 2014 for U.S. Appl. No. 14/015,850, filed Aug. 30, 2013 in the name of Saint-Gobain Glass France.

* cited by examiner

The panes (1, 2) are placed in a pre-bending ring (7a) on a movable bending ring holder (3).

The bending ring holder (3) travels into a furnace (4) and the panes (1, 2) are heated by a heating device (6) to 580°C to 650°C.

The panes (1, 2) are pre-bent in the pre-bending ring (7a) by gravity to 5% to 40% of the mean final bend.

The panes (1, 2) are lifted by a convex suction device (5) in the pre-bending region (B1) and bent to 102% to 130% of the mean final bend.

The panes (1, 2) are lifted by a second convex suction device (15) in the final bending region (B2) and pressed against a concave counter mold (16) and bent.

The panes (1, 2) are bent by gravity in a final bending ring (7b) to the final bend and then cooled.

FIG. 3

METHOD AND DEVICE FOR BENDING SHEETS

CROSS REFERENCE TO RELATED APPLICATIONS

The present application is the US national stage of International Patent Application PCT/EP2011/072170 filed on Dec. 8, 2011 which, in turn, claims priority to European Patent Application EP 10194711.7 filed on Dec. 13, 2010.

The invention relates to a method and a device for bending panes, a furnace for bending panes, and the use of the furnace.

Besides aspects of the equipment, the development of new motor vehicles is also determined to a large extent by design elements. In this, the significance of windshield design is increasing because of the large, highly visible area. In this regard, not only the appearance of the windshield, but also aspects for energy conservation and environmental impact play a role. Powerful microprocessors as well as CAD (Computer-Aided Design) supported software packages also enable greater adaptation and optimization of the aerodynamic resistance of the windshield. For this reason, modern windshields in motor vehicles have increasingly complex shapes. In particular, motor vehicles with very low fuel consumption but also sports cars make high demands on pane geometry and thus also on the glass pane bending methods necessary for their implementation. The bending of a glass pane can be realized, for example, through a combination of gravity bending and press bending. One or a plurality of glass panes are placed in a bending ring and heated. In this process, the glass pane is bent along the geometry predefined by the bending ring with the help of gravity acting on the heated glass pane. Then, the heated glass is bent into the corresponding shape with the help of negative pressure and a suitable frame.

More complex geometries cannot usually be realized with a single bending process. This is rendered more difficult by the fact that separate or subsequent bending processes cannot be combined arbitrarily. These factors clearly limit the possibilities of obtaining the pane geometries sought. In particular, the combination of edge bending and surface bending to produce complex geometries can be realized only with difficulty.

EP 0 677 491 A2 discloses a method for bending and tempering glass panes. The glass panes are heated to their softening temperature, pressed between two complementary shapes in a device, and then transferred into a transport ring. The panes are then tempered and cooled in the transport ring.

EP 1 371 616 B1 discloses a device for bending and tempering glass panes. The device comprises, among other things, successive mold carriers, preheating sections for heating glass panes to bending temperature, a gravity-based pre-bending section, a bending section with a press mold, and a cooling section.

EP 1 358 131 B1 discloses a method for bending of glass panes in pairs. For this, the pair of glass panes is pre-bent in a horizontal position on a bending mold in the form of a frame by gravitational bending. Then, the pair of glass panes is further bent with an entire surface bending mold.

US 2008/0134722 A1 discloses a method and a device for bending superposed panes. The panes are lifted by a suction mold and pressed by an opposing mold and bent according to the geometry.

The object of the present invention is to provide a method for bending panes that enables even the bending of complex geometries quickly in the least possible process steps and with minimal energy consumption.

The object of the invention is accomplished by a method and device according to the independent claims. Advantageous embodiments emerge from the dependent claims.

The method for bending panes according to the invention enables the combination of edge bending as well as surface bending. The method comprises a first step, wherein at least one pane, preferably a first pane and a second pane, are placed in a pre-bending ring on a movable bending ring holder. The method is suitable for both one pane and for the bending of panes in pairs. The pre-bending ring preferably has a mean final bend of the edge of 5% to 50%. The movable bending ring holder then moves into a furnace and the panes are heated in the pre-bending ring by a heating device at least to the softening temperature of the glass, preferably 550° C. to 800° C. The softening temperature is determined by the composition of the glass. The panes placed in the pre-bending ring are pre-bent through the action of gravity to 5% to 50% of the local final bend of the edge. In the context of the invention, the term "final bend of the edge" is the mean (final) bend in the final, finished state of at least a part of the edge of the pane or bending ring edge with a dimension or length of at least 30% of the total bending ring edge or pane edge. The panes are lifted in the next step by a (first) suction device and bent further beyond the bending obtained in the pre-bending ring. The panes are preferably bent to 102% to 130% of the final bend of the edge. The bending takes place over a counter framework situated in the suction device. The counter framework preferably has the shape of a ring with a protruding, bent contact surface. The suction device includes, in addition to the counter framework, a cover with an air baffle surrounding the counter framework. The air baffle is situated adjacent the lifted pane and is designed such that, during the bending on the contact surface of the counter framework, the pane is at a distance of 3 mm to 50 mm from the air baffle. This distance enables continuous suction of air in the intermediate space between the pane and the air baffle. The air sucked in generates a negative pressure for fixing the pane on the contact surface. The suction process bends the panes corresponding to the bend (curvature) of the contact surface. The contact region of the molded part, in particular the contact surface with the pane, is preferably lined with a flexible or soft material. This material preferably includes fire resistant fibers of glass, metal, or ceramic, and prevents damage such as scratches on the panes. A description of the mode of operation and structure of the suction device for lifting the pane is found in US 2008/0134722 A1, [0036] and [0038] through [0040] as well as claim 1 a). The panes are then placed by the suction device in a final bending ring on the movable bending ring holder. The final bending ring preferably has at least a 30% larger mean final bend of the edge than the pre-bending ring. The placement of the panes can take place, for example, by raising the suction pressure by means of a pressure drop in the suction device. The pre-bending ring and the final bending ring are, in each case, bent corresponding to the intended pane geometry. The circumference and the opening angle of the bending ring are adapted to the geometry of the pane to be bent. The pre-bending ring and the final bending ring are preferably disposed on the same movable bending ring holder and can, for example, be converted by removal of a pin or a bracket from the pre-bending ring into the final bending ring. In the context of the invention, the term "convert" means both the changing of the shape (geometry) of the bending ring from the pre-bending ring to the final bending ring and a taking off of the pre-bending ring as well as "making accessible" a final bending ring disposed beneath the pre-bending ring. The pane placed on the final bending ring is pre-bent by thermal irradiation in the surface. For this, a temperature gradient is set above the pane and different surface bending is enabled by the different heating. The heating device preferably includes an arrangement of individual separately controllable heating tiles. As a result of the different thermal radiation of the tiles, different temperature regions can be realized on the panes. Then, the panes are lifted by a second suction device. The second suction device preferably has the same structure as the first suction device. In the next step, the panes are pressed against a counter mold and preferably bent in the surface of the pane. The structure of this counter mold is described in US2008/0134722 A1 in [0037] and FIG. 2. The counter mode functions as a negative of the surface bend of the pane and bends the pane into the final surface geometry. Then, the panes are placed on the final bending ring and cooled.

The panes preferably include glass, particularly preferably flat glass (float glass), quartz glass, borosilicate glass, and/or soda lime glass.

The panes are preferably lifted by the suction device and bent to 100% to 130%, preferably to 105% to 120% of the mean overall final bend of the edge. The term "overall final bend of the edge" refers to a uniform bending of the entire pane expressed as a percentage. The panes are preferably shaped on a bending ring (counter framework) in the suction device such that they have a bend of the edge that exceeds, in shape or extent, the amount of the final bend of the edge.

The pane is preferably bent by the suction device with a locally different final bend of the edge. The term "local final bend of the edge" refers to a nonuniform (final) bend (of the edge) of the entire pane expressed as a percentage.

The pane is preferably bent locally in the first and/or second suction device by a stream of air or a lower bending ring. The term "locally" means individual regions of the pane, in which an additional bend is set in a limited region by a stream of air, preferably from a nozzle. Alternatively, the local bending described can occur by means of a bending ring applied from below.

The panes are preferably heated by a temperature gradient on the glass surface with a maximum of 0.05 K/mm to 0.5 K/mm, preferably 0.1 K/mm to 0.2 K/mm. The adjustment of the temperature gradient takes place preferably via heating devices differently controlled (i.e., different amounts of radiated heat) and placed above or below the panes.

The panes are preferably heated to a temperature of 500° C. to 750° C., particularly preferably 580° C. to 650° C.

The panes are preferably pre-bent by gravity in the pre-bending ring to 10% to 30% of the mean final bend.

The suction device preferably builds a suction pressure of 1 kg/m$^2$ to 100 kg/m$^2$. This suction pressure is sufficient to securely fix the panes on the suction device and to bend them over the counter framework.

The invention further includes a pane, in particular a pair of panes, bent with the method according to the invention.

The invention further includes a furnace for bending panes, preferably for bending panes in pairs. The furnace comprises at least one heating device installed in the furnace and a bending ring holder movable inside and outside the furnace with a bending ring as a pre-bending ring and/or final bending ring. The bending ring is preferably adjustable or convertible both as a pre-bending ring and a final bending ring. The pre-bending ring and the final bending ring can, for example, be converted by the removal of a pin or a bracket from the pre-bending ring into the final bending ring. In the context of the invention, the term "convert" means both the changing of the shape (geometry) of the bending ring from the pre-bending ring to the final bending ring and a taking off of the pre-bending ring as well as "making accessible" a final bending ring disposed beneath the pre-bending ring. Inside a pre-heating region, the panes (first pane and/or the second pane) are heated to a softening temperature. In a first bending region, a first, vertically displaceable, preferably convexly bent suction device is connected to the preheating region in the pre-bending region. The suction device enables picking up the panes out of the pre-bending ring, bending the pane, and placing the pre-bent pane back on the final bending ring. The suction device comprises at least one counter framework with a bent contact surface. The bend of the contact surface is preferably greater than the bend of the pre-bending ring; preferably the bend of the contact surface is at least 30%, particularly preferably at least 90%. The counter framework is surrounded by a cover with an air baffle and there is a minimum distance of 3 mm to 50 mm between the contact surface and the air baffle. The air baffle protrudes downward beyond the lowest point of the bent contact surface. A heating region for heating or tempering the panes situated on the movable bending ring connects to the suction device. The pane placed on the final bending ring is pre-bent in the surface by thermal irradiation. For this, a temperature gradient is set above the pane and different surface bending is enabled by the different heating. The heating device preferably includes an arrangement of individual separately controllable heating tiles. As a result of the different thermal radiation of the tiles, different temperature regions can be realized on the panes. A second bending region is situated adjacent the heating region in the direction of movement of the panes. The second bending region includes a second, vertically displaceable suction device as well as a horizontally and vertically displaceable, preferably concavely bent counter mold. In conjunction with the second suction device, the counter mold enables surface bending of the pane. The structure of this counter mold is described in US2008/0134722 A1 in [0037] and FIG. 2. In the process direction, a cooling region connects to the second bending region. The cooling region constitutes the final portion of the furnace according to the invention. The preheating region, first bending region, heating region, second bending region, and the cooling region are disposed connected in succession in the process direction. The furnace according to the invention has heating devices for heating in the regions preheating region, first bending region, heating region, second bending region, cooling region. The heating devices can be disposed under, beside, or even above the movable bending ring holder.

The movable bending ring holder is preferably moved by a transport device situated inside and outside the furnace.

A third suction device is preferably disposed in the second bending region. This increases the cycle time of the furnace according to the invention.

The heating device preferably includes radiant heaters, particularly preferably infrared radiators.

The heating device preferably includes an arrangement of individual separately controllable heating tiles. As a result of the different thermal radiation of the tiles, different temperature regions can be realized on the panes. The different temperature regions enable a gradual heating of the surface of the panes.

The invention further includes the use of the furnace according to the invention for bending panes to be laminated, preferably motor vehicle windshields.

The invention further includes the use of a pane according to the invention as a windshield, preferably as a windshield of a motor vehicle.

In the following, the invention is explained in detail with reference to drawings and an exemplary embodiment as well as a comparative example. The drawings are purely schematic depictions and not to scale. They in no way limit the invention.

Figure 2:
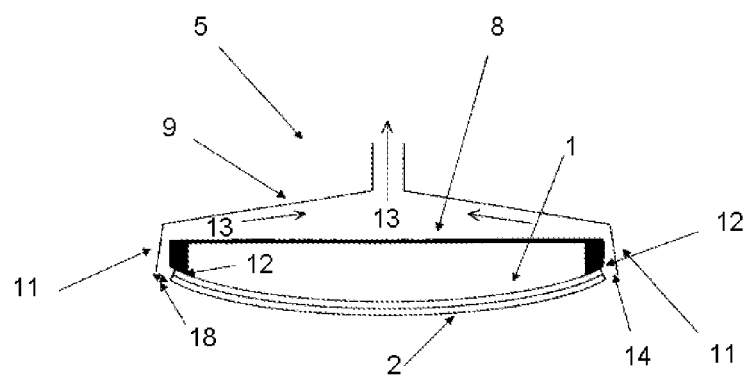

They depict:

FIG. 1 a cross-section of the furnace according to the invention,

FIG. 2 a cross-section of the suction device, and

FIG. 3 a flowchart of the method according to the invention.

FIG. 1 depicts a cross-section of a furnace (4), according to an example embodiment of the invention. The furnace (4) comprises heating devices (6) and bending ring holders (3) movable inside and outside the furnace (4) by a transport device (10) having, in each case, a pre-bending ring (7a). Inside a preheating region (A), the panes (1, 2) are heated to the softening temperature of the respective glass. In the pre-bending region (B), a first, vertically displaceable, preferably convexly bent suction device (5) connects to the preheating region (A). The suction device (5) enables picking up the panes (1, 2) out of the bending ring holder (3), pre-bending the panes (1, 2), and placing the pre-bent panes (1, 2) on a final bending ring (7b). The pre-bending ring (7a) and the final bending ring (7b) can be converted, for example, by the removal of a pin or a bracket from the pre-bending ring (7a) into the final bending ring (7b). An intermediate region (C) for heating the panes (1, 2) placed on the final bending ring (7b) connects to the suction device (5) in the pre-bending region (B). The final bending region (D) with a second vertically displaceable, convexly bent suction device (15) is situated adjacent the intermediate region (C). The second vertically displaceable, convexly bent suction device (15) is horizontally movable and enables lifting and bending of the panes (1, 2). The second vertically displaceable, convexly bent suction device (15) corresponds in its basic structure to the suction device (5). The basic structure of the suction device (5, 15) is also described in US2008/0134722 A1. The corresponding final bend can be produced in the panes (1, 2) picked up by the convexly bent suction device (15) by a horizontally and vertically displaceable concavely bent counter mold (16). The panes (1, 2) are pressed between the convexly bent suction device (15) and the concavely bent counter mold (16). To increase the cycle speed, yet another third suction device (17) can be installed in addition to the convexly bent suction device (15). The third suction device (17) can pick up panes while panes are being bent in the second suction device. After conclusion of the pressing or bending process, the panes (1, 2) can be placed back on the final bending ring (7b) by the convexly bent suction device (5). A cooling region (E) forms the final portion of the furnace (4) according to an example embodiment of the invention. The preheating region (A), the pre-bending region (B), the intermediate region (C), the final bending region (D), and the cooling region (E) are disposed connected in succession.

FIG. 2 depicts a cross-section of the suction device (5). The suction device (5) includes a counter framework (8) and a cover (9) surrounding the counter framework (8). The counter framework (8) can be bent over as a whole or locally relative to the final bending ring (7b) (not shown). The counter framework acts as a "negative mold" relative to the final bending ring (7b) (not shown). A stream of air (13) is drawn into the suction device (5) over the edge zone (14) between the counter framework (8) and the cover (9). With the help of the resultant negative pressure, the panes (1, 2) are suctioned, lifted, and bent. The contact surface (12) of the counter framework (8) with the second pane (2) is preferably lined with a flexible or soft material, such as fire resistant fibers of glass, metal, or ceramic.

FIG. 3 depicts a flowchart of the method according to the invention. Two panes (1, 2) are placed in a pre-bending bending ring (7a) on a movable bending ring (3). The bending ring (3) is then transported into a furnace. The panes (1, 2) are heated by a heating device (6) consisting of radiation heating elements to the softening temperature of the panes (1, 2), roughly 580° C. to 650° C. During the course of the heating of the panes (1, 2), the panes (1, 2) situated in the pre-bending ring (7a) are pre-bent with the help of gravity to 5% to 40% of the mean final bend to be obtained. The heating device preferably comprises an arrangement of individual separately controllable heating tiles. As a result of the different thermal radiation of the tiles, different temperature regions can be realized on the panes (1, 2). The different temperature regions enable a gradual heating of the surface of the panes. The panes (1, 2) are then lifted by a preferably convex suction device (5) and bent to 102% to 130% of the mean final bend. In a next step, the panes (1, 2) are placed by the convex suction device (5) on the final bending ring (7b) on the movable bending ring holder (3). The pre-bending ring (7a) and the final bending ring (7b) are in each case bent corresponding to the intended pane geometry. The pre-bending ring (7a) and the final bending ring (7b) are preferably disposed on the same movable bending ring holder (3) and can be converted, by the removal of a pin from the pre-bending ring (7a), into the final bending ring (7b). The panes are heated in the intermediate region (C). The panes (1, 2) placed on the final bending ring (7b) are pre-bent in the surface by heat irradiation. For this, a temperature gradient is set above the panes (1, 2) in the intermediate region (C) and different surface bending is enabled by the different heating. The heating device (6) preferably includes an arrangement of individual separately controllable heating tiles. As a result of the different thermal radiation of the tiles, different temperature regions can be realized on the panes (1, 2). Then, the panes are lifted in the final bending region (D) by a second suction device (15) and pressed against a preferably concave counter mold (16) and shaped. The counter mold has "inverse" geometry compared to the second suction device (15). Then, the panes (1, 2) are placed on the final bending ring (7b) and cooled.

LIST OF REFERENCE CHARACTERS (1) first pane
(2) second pane
(3) movable bending ring holder
(4) furnace
(5) (first) suction device
(6) heating device
(7a) pre-bending ring
(7b) final bending ring
(8) counter framework
(9) cover
(10) transport device
(11) air baffle
(12) contact surface
(13) stream of air
(14) edge zone
(15) second suction device
(16) counter mold
(17) third suction device
(18) distance between the pane and the air baffle
(A) preheating region
(B) pre-bending region
(D) second bending region
(C) heating region
(E) cooling region

The invention claimed is:

1. A method for bending a pane, comprising:
   placing at least one pane in a pre-bending ring with a movable bending ring holder, the movable bending ring holder being moved into a furnace, and the at least one pane being heated to a softening temperature and pre-bent to a pre-bending, which comprises from 5% to 50% of a final bend of an edge;
   lifting the at least one pane by a first suction device;
   further bending, with a first suction made by means of the first suction device, the at least one pane beyond the pre-bending obtained in the pre-bending ring, wherein during the further bending on a bent contact surface of a counter framework of the first suction device, a minimum distance of 3 mm to 50 mm between the at least one pane and an air baffle of a cover of the first suction device that surrounds the counter framework is present;
   placing the at least one pane by means of the first suction device in a final bending ring on the movable bending ring holder;
   bending the at least one pane to the final bend of the edge, wherein a surface pre-bending of the at least one pane in the final bending ring takes place by means of a thermal irradiation;
   by means of a second suction device:
   lifting the at least one pane;
   pressing, with a second suction made by means of the second suction device, the lifted at least one pane against a counter mold, wherein the lifted at least one pane is bent into a final surface geometry; and
   replacing the pressed at least one pane, onto the final bending ring; and cooling the replaced at least one pane.

2. The method according to claim 1, wherein the at least one pane is bent by the first suction device to 100% to 130% of the final bend of the edge.

3. The method according to claim 2, wherein the at least one pane is bent by the first suction device to 105% to 120% of the final bend of the edge.

4. The method according to claim 1, wherein the at least one pane is bent by the first suction device with a locally different final bend of the edge.

5. The method according to claim 4, wherein the at least one pane is bent locally in the first or second suction device by a stream of air or a lower bending ring.

6. The method according to claim 1, wherein the at least one pane is heated by a temperature gradient on a glass surface with a maximum of 0.05 K/mm to 0.5 K/mm.

7. The method according to claim 6, wherein the at least one pane is heated by a temperature gradient on the glass surface with a maximum of 0.1 K/mm to 0.2 K/mm.

8. The method according to claim 1, wherein the at least one pane is heated to a temperature of 500°C. to 750°C.

9. The method according to claim 8, wherein the at least one pane is heated to a temperature of 580° C. to 650° C.

10. The method according to claim 1, wherein the at least one pane is pre-bent by gravity in the pre-bending ring to 10% to 30% of a local final bend of the edge.

11. The method according to claim 1, wherein the suction device builds a suction pressure of 1 kg/m$^2$ to 100 kg/m$^2$.

12. The method according to claim 1, wherein two panes are bent.

* * * * *